United States Patent Office 3,553,196
Patented Jan. 5, 1971

3,553,196
HIGH-AMYLOSE STARCH ACETATE
Arthur M. Mark and Charles L. Mehltretter, Peoria, Ill., assignors to the United States of America as represented by the Secretary of Agriculture
No Drawing. Original application Ser. No. 812,926, Apr. 2, 1969. Divided and this application July 10, 1969, Ser. No. 855,439
Int. Cl. C08b 19/02
U.S. Cl. 260—233.5                             1 Claim

ABSTRACT OF THE DISCLOSURE

Water-soluble food packaging films are cast from aqueous dispersions prepared by steam jet cooking high-amylose corn starch acetates of D.S. 0.21 to 0.31 at 177° C. to disintegrate the granules present. The acetates were produced in granule form by acetylating high-amylose corn starch of 70 percent apparent amylose content with acetic anhydride in a mixer at 90° to 95° C. for 30 minutes using 1.5 percent sodium hydroxide (based on dry starch) as catalyst.

---

A nonexclusive, irrevocable, royalty-free license in the invention herein described, throughout the world for all purposes of the United States Government, with the power to grant sublicenses for such purposes, is hereby granted to the Government of the United States of America.

This application is a division of Ser. No. 812,926, filed Apr. 2, 1969.

Prior art methods for the preparation of amylose and high-amylose corn starch partial acetates for film use yield products that are not in the granule state, require isolation by impractical procedures, and produce water-resistant films. This invention covers the preparation of high-amylose cornstarch acetates of D.S. 0.21 to 0.31 in granule form for ready isolation and purification. In a following step the granules are disintegrated by steam jet cooking and the resulting aqueous dispersion used for the preparation of transparent, strong, flexible, and water-soluble film.

This invention relates to water-soluble, transparent sheets or films. More particularly, it relates to water-soluble transparent films of high tensile strength, flexibility, and clarity suitable for use as water-soluble, edible packaging materials for dry food products and to the method of making the same.

Water-soluble, transparent films approved for food packaging by the Food and Drug Administration have been produced heretofore from methyl cellulose, hydroxypropyl cellulose, and hydroxypropylated high-amylose corn starch. Methyl cellulose films are not soluble in hot water, which limits their usefulness as edible food packaging. Prior art methods for the production of amylose and high-amylose corn starch partial acetates for film use have yielded products that were not in the granule state and required isolation by impractical procedures. For instance, in Example 7 of U.S. Pat. 3,038,895 the amylose acetate prepared in an aqueous medium was obtained as a gel which required grinding and washing in water to remove soluble salts. In the same example another technique for isolation of the amylose acetate from the esterification reaction mass was suggested which utilized precipitation with alcohol. Obviously these isolation procedures are costly and not conducive to commercial adoption. In U.S. Pat. 3,130,081, Example 9, amylose acetate was prepared in aqueous solution at pH 7.5 to 8.5. The product was purified for film use by dialysis in running water for 10 hours, which obviously is not commercially feasible for the production of films. Isolation of the product in dry form would require expensive precipitation with alcohol or evaporation and drum or spray drying and the product would contain enough inorganic salts to be deleterious to films.

We have now found that commercial high-amylose corn starch of 70 percent amylose content containing from 10 to 20 percent but preferably 12 to 15 percent moisture can be partially acetylated in granule form by acetic anhydride under acidic conditions using sodium hydroxide for activation of the starch prior to the acetylation reaction. A high temperature of reaction of 90° to 95° C. for 30 to 60 minutes and sufficient excess acetic anhydride are required to achieve a degree of acetyl group substitution (D.S.) of 0.21 to 0.31. After the reaction period, the acetic acid formed is distilled out of the reaction mixture under vacuum and recovered for conversion to acetic anhydride for reuse. The high-amylose corn starch partial esters are not degraded significantly by this process as determined by intrinsic viscosity measurements and the products obtained in granule form are readily filtered, washed free of residual acetic acid and sodium acetate with water and dried. The products, however, when dispersed in hot water and cast on to a silicone-treated polished glass plate produced films of poor tensile strength, clarity, and flexibility because of the presence of a high proportion of swollen, undisintegrated starch acetate granules. It was thought that to obtain higher quality films the granules would have to be disintegrated without appreciable degradation of the starch polymer. Consequently, the aqueous slurries of the partially acetylated high-amylose corn starches were autoclaved at various temperatures to find optimum conditions for granule disintegration without undue degradation of the polymer. It was found that autoclaving at 140° C. for 30 minutes produced considerable degradation of the polymer as determined by intrinsic viscosity measurements. Lowering the temperature to 120° C. and autoclaving for 30 minutes produced much granule disintegration with little polymer degradation. This product of D.S. 0.25 was solubilized to the extent of 93.4 percent when heated at 1 percent concentration in water at 100° C. for 15 minutes and cooled to 25° C. Films cast from a 10 percent hot aqueous dispersion of the product showed only minor improvement in tensile strength, flexibility, and clarity over those obtained with the untreated partial acetate. Increasing the time of autoclaving at 120° C. to 1 hour to increase granule disintegration caused a marked degradation of the ester and was therefore undesirable. Aqueous slurries of the acetate of D.S. 0.25 were also exposed to ultrasonic vibrations for 30 minutes but considerable degradation of the polymer occurred under these conditions and the films obtained from the product had poor flexibility and clarity. To our surprise, however, when an aqueous slurry of the high-amylose corn starch partial acetate of D.S. 0.25 was heated in a continuous steam injection cooker at the high temperature of 177° C., very little degradation of the product occurred as shown by intrinsic viscosity, and essentially complete disintegration of the granules was achieved as noted by microscopic observation and high solubility of the product in 1 percent aqueous dispersion. Apparently, the high-operating temperature of the cooker was balanced by the short dwell time to produce the unexpected results obtained.

Water solubilities of the films prepared from the jet-cooked high-amylose corn starch acetates of the invention are shown in Table 1.

As shown in Table 1, films prepared from the jet-cooked esters of D.S. 0.25 and 0.31 are essentially completely soluble in hot and cold water. Those of D.S. 0.21 are soluble in hot water and are also covered by the invention. However, the films prepared from the ester of D.S. 0.14 are only partially soluble in boiling water, are essentially insoluble in cold water, and are therefore not a part of this invention.

TABLE 1.—WATER SOLUBILITY OF FILMS FROM JET-COOKED HIGH-AMYLOSE CORN STARCH ACETATES

| D.S. | Solubility, percent | |
|---|---|---|
| | 25° C.[1] | 100° C.→25° C.[2] |
| 0.14 | 1.0 | 46.1 |
| 0.21 | 35.2 | 99.0 |
| 0.25 | 99.5 | 99.6 |
| 0.31 | 99.6 | 99.7 |

[1] Mild agitation of 1.00 g. of film in 50 ml. of water at 25° C. for 2 hours.
[2] Boiling 1.00 g. of film in 50 ml. of water for 2 minutes and cooling to 25° C.

Hot aqueous dispersions of the jet-cooked products of D.S. 0.25 and 0.31 clarified by supercentrifugation gave films that were completely soluble in hot and cold water. It is of commercial significance that films of the jet-cooked high-amylose starch acetate of this invention are soluble in hot water since the methyl cellulose films suitable for food packaging are quite insoluble in hot water.

Hot water dispersions of our products up to 25 percent concentration remain homogeneous and fluid and such hot dispersions can be cast on to a silicone-treated polished glass plate to obtain films of high clarity, gloss, tensile strength, and flexibility. Hot dispersions of 25 percent concentration or more, probably could be extruded for film production. Supercentrifugating the hot dispersions to remove the small number of undisintegrated granules remaining produced even more remarkable flexibility of the films and illustrates the deleterious effect of the presence of granules in films on flexibility, tensile strength, and clarity.

Films prepared from the jet-cooked products remained flexible without plasticization when kept in medium or high humidity atmospheres. Good flexibility was also maintained on storage of the films in a refrigerator at 10° C. and −10° C. However, retention of flexibility at 30 percent relative humidity required plasticization of the films with 25 percent glycerol. The best acetate films had tensile strength, flexibility, gloss, and clarity comparable to those of commercial packaging films. Films coated with butter and soybean oil at 25° C. for 1 month showed no penetration of these products. Hot and cold water solubility, no measurable oxygen transmission, high grease barrier properties, and potential edibility suggest usefulness of the films in packaging dry foodstuffs such as soluble coffee, tea, and soups intended to be added to hot or cold aqueous liquids prior to use. Other applications are in the protective coating of easily oxidized food products and as sizings for paper and textiles.

In the process of the invention, the minimum degree of acetyl substitution in the high-amylose corn starches that will produce essentially completely water-soluble films is 0.21, and the maximum D.S. covered by the invention is 0.31. Higher degrees of substitution are not required for good water solubility and would be more costly to produce. The acetylation procedure produces a maximum D.S. of about 0.31 in the products utilizing the practical amounts of acetic anhydride described in the invention. Increasing the amount of acetic anhydride beyond 176 g./200 g. of starch (dry basis) did not further increase the D.S. of the product. Catalyst in excess of 1.5 percent based on starch also did not raise the D.S. level and tended to degrade the starch.

In acetylations carried out with starches of varied moisture content, the starch was first dried at 100° C. for 16 hours and the desired amount of water then added. A moisture content of 12–15 percent is required to attain the highest D.S. when the largest practical amount of acetic anhydride is used, i.e., 176 g. per 200 g. of dry starch.

The particular advantages of the process are (1) that the partially acetylated high-amylose corn starches are produced under acidic conditions with minimum degradation and are recovered in water-insoluble granular form for ease of removal of residual acetic acid and sodium acetate; (2) that byproduct acetic acid is readily removed from the product in the reactor by vacuum distillation using a water or steam jet pump and can be converted to acetic anhydride by known methods for reuse; and (3) that short-time continuous jet cooking of aqueous slurries of the acetates at high temperatures of 160°–177° but preferably 177° C. produces essentially complete granule disintegration with only a minimum of degradation of the starch acetate polymer required for high-quality film production.

As a matter of convenience in determining the film-forming properties of the products, the jet-cooked dispersions were treated with ethanol to precipitate the products which were then isolated by filtration and air dried. The dry products were then dispersed in water at 90°–95° C. in 10 percent concentration for casting of the films. However, in practice, the filtered and washed high-amylose corn starch acetates from the reactor would be slurried in about 30 percent concentration in water and jet cooked to obtain hot aqueous dispersions of about 20 percent concentration which could be cast directly into films or diluted with water and cast on to polished plates or drums for drying to films. The aqueous dispersions could also be drum dried or spray dried to obtain the dry product for eventual film formation. The following examples will further illustrate the embodiment of our invention.

EXAMPLE 1

A 230 g. quantity of 70 percent high-amylose corn starch (Amylon VII, Nation Starch and Chemical Corporation, New York, New York) containing 13 percent moisture was placed in a 1.5 l. sigma blade mixer (Read Standard Division, Capitol Products Corporation, York, Pa.). Under agitation 3 g. of sodium hydroxide in 50 percent aqueous solution was added dropwise to the starch. After 5 minutes 44 to 176 g. of acetic anhydride was added (to attain D.S. levels of 0.10 to 0.31) and the temperature was raised to 90°–95° C. by introducing steam to the jacket of the mixer, and held in this range for 30 minutes with continuous mixing. During an additional 30 minutes of agitation, 97 percent of the free acetic acid formed in the reaction was recovered by distillation at 70° to 90° C. and about 200 mm. pressure (water pump).

From a preparation with 176 g. of acetic anhydride, a fluffy white product was obtained that contained 5.3 percent acetic acid and 3.1 precent sodium acetate. The crude acetate was purified by stirring it with 700 ml. of water, collecting the product on a coarse sintered glass funnel and washing it twice on the funnel with 150 ml. of water. The air-dried purified product which weighed 230 g. contained 13 percent moisture, 0.08 percent free acetic acid, and no sodium acetate. From the saponification value of the product (corrected for free acetic acid present) the D.S. was calculated to be 0.31. Microscopic examination showed almost no disintegration of the starch granules. An intrinsic viscosity of 1.06 in 1 N potassium hydroxide for the starch liberated from the acetate in the alkaline dispersion was the same as that for the unmodified starch. Therefore, no measurable degradation had occurred during acetylation.

The use of 352 g. of acetic anhydride with 200 g. of starch (dry basis) did not give a D.S. of the starch acetate greater than that obtained for the product prepared with 176 g. of acetylating agent. It was found that alkali catalyst in excess of 1.5 percent based on starch also did not raise the D.S. and tended to degrade the starch. Acetylation without alkali and utilizing 176 g. of acetic anhydride produced acetates having a D.S. of only 0.10 to 0.13.

Acetyl content of the esters was determined by the Genung and Mallatt procedure on samples that had been dried 4 hours at 100° C. in vacuo. The amount of sodium acetate in the products was calculated from the amount of sodium sulfate ash obtained by igniting samples in the presence of sulfuric acid.

EXAMPLE 2

A 230 g. quantity of 70 percent high-amylose corn starch (National Starch and Chemical Corporation, New York, N.Y.) containing 13 percent moisture was placed in a jacketed sigma blade mixer (Readco, Read Standard Division, Capitol Products Corporation, York, Pa.). Three g. of sodium hydroxide in 50 percent aqueous solution was adsorbed on the starch under agitation. After 5 minutes 88 g. of acetic anhydride was added and the temperature raised to 90°–95° C. by introduction of steam to the mixer jacket and held in this range for 30 to 60 minutes with continuous mixing. Heating was discontinued and acetic acid was removed by distillation under reduced pressure and agitation during an additional 30 minutes.

The dry product obtained contained 5.3 percent acetic acid and 3.1 percent sodium acetate. After stirring in 700 ml. of water, it was collected on a coarse sintered glass funnel and washed twice on the funnel with 150 ml. of water. The air-dried product, 225 g. (moisture, 12 percent), had a D.S. of 0.21. Microscopic examination showed that a high proportion of the starch granules in the product remained intact. An intrinsic viscosity of 1.05 in 1 N potassium hydroxide at 25° C. was found for the starch moiety which was nearly the same as that for the unmodified starch and indicated that very little degradation had occurred during acetylation.

EXAMPLE 3

A 230 g. quantity of 70 percent high-amylose corn starch (National Starch and Chemical Corporation, New York, N.Y.) containing 13 percent moisture was placed in a jacketed sigma blade mixer (Readco, Read Standard Division, Capitol Products Corporation, York, Pa.). Three g. of sodium hydroxide in 50 percent aqueous solution was adsorbed on the starch under agitation. After 5 minutes 44 g. of acetic anhydride was added and the temperature raised to 90°–95° C. by steam heat as in Example 1 and held in this range for 30 minutes with continuous mixing. Heating was discontinued and acetic acid was removed by distillation under reduced pressure and agitation during an additional 30 minutes. The fluffy dry product was removed from the mixer and stirred in 700 ml. of water. It was then collected on a coarse sintered glass funnel and washed twice on the funnel with 150 ml. of water. The air-dried product, 230 g. (moisture, 13 percent), had a D.S. of 0.10 and contained 0.08 percent acetic acid and no sodium acetate. An intrinsic viscosity of 1.06 in 1 N potassium hydroxide at 25° C. was found for the starch moiety which was the same as that for the unmodified starch and indicated that no measurable degradation had occurred during acetylation.

EXAMPLE 4

High-amylose corn starch of 70 percent amylose content was acetylated as in Example 2 to give a product of D.S. 0.25. The filtered and washed product in 30 percent slurry in water was cooked at 177° C. in a Penick and Ford, Ltd. continuous steam injection cooker for 4 minutes and the hot dispersion of about 20 percent concentration allowed to cool to room temperature. The product was isolated by precipitating with ethanol, filtering, and drying. It was then heated in water at 90°–95° C. for 15 minutes at 10 percent concentration by weight and the dispersion cast hot on to a silicone-treated polished glass plate drawn with a 16-inch casting blade having 30 mils clearance and air dried at room temperature. The film of 1.0 to 1.3 mils thickness was removed from the plate and equilibrated at 50 percent relative humidity and 25° C. for 24 hours.

Clarification of diluted jet-cooked aqueous dispersion was achieved by supercentrifugation in a Sharples Supercentrifuge.

The autoclaved and ultrasonic treated acetylated high-amylose corn starches were isolated by alcohol precipitation as above for convenience and films were prepared for testing in the same manner as above.

Flexibility of the films was obtained on an MIT double fold tester under 0.5 kg. load. Tensile strength and elongation were determined on a Scott 1P 2 incline plane serigraph.

Properties of the high-amylose starch acetate D.S. 0.25 subjected to the various granule disintegrating treatments and the films prepared therefrom are shown in Table 2. It is seen that flexibility is only improved by those granule-breaking treatments that do not degrade the starch acetate polymer. The surprising tenfold increase in flexibility of the jet-cooked and clarified starch acetate film over the untreated starch acetate control film appears to be directly related to the absence of granules. About a sixfold increase in flexibility was achieved without clarification. The poor flexibility of the films prepared from the utrasonic treated acetate was, no doubt, due in part to excessive degradation of the polysaccharide as shown by the low intrinsic viscosity of the product.

TABLE 2.—EFFECT OF GRANULE DISINTEGRATING TREATMENTS ON HIGH-AMYLOSE CORN STARCH ACETATE [1] AND ITS FILMS

| Treatment | Acetate | | Films [2] | | | |
|---|---|---|---|---|---|---|
| | Intrinsic viscosity, 1 N KOH | Residue,[3] percent | Elongation, percent | Tensile strength, p.s.i. | Flexibility double folds (MIT) load, 0.5 kg. | Clarity |
| None | 1.06 | 32.3 | 5–10 | 5,968 | 178 | Low. |
| Jet cooking (177° C.) | 1.02 | 0.3 | 10–15 | 6,828 | 1,111 | High. |
| Clarification [4] | | 0 | 15–20 | 7,264 | 1,847 | Very high. |
| Autoclaving (120° C.) | 1.05 | 6.6 | 5–10 | 6,317 | 237 | Medium. |
| Ultrasonic | 0.91 | 4.2 | 10–15 | 5,815 | 151 | Medium. |

[1] D.S. 0.25; 70 percent apparent amylose content.
[2] Unplasticized and 1 to 1.3 mils thick; average of 10 test strips at 50 percent relative humidity and 25° C.
[3] Residue after cooking 1 percent aqueous dispersion at 100° for 15 minutes and cooling to 25° C.
[4] Aqueous dispersion of jet-cooked product clarified by ultracentrifugation.

EXAMPLE 5

High-amylose corn starch of 70 percent amylose content was acetylated as in Example 1 to a product having a D.S. of 0.23. The filtrate of the isolated product had a pH of 3.5. The washed product in 30 percent slurry in water was continuously jet cooked at 177° C. as in Example 4 and the resulting hot dispersion of about 22 percent concentration was concentrated in a vacumm rotary evaporator to dryness. The dry product was cooked in water at 90°–95° C. at 10 percent concentration for 15 minutes and film was cast from the hot dispersion as in Example 4.

Tensile strength of the film from the unclarified dispersion was 6,750 p.s.i., flexibility was 1,012 double folds (MIT; 0.5 kg. load), and clarity was good. Oxygen transmission of the film was so low that it was not measurable over a 24-hour period after equilibration at 50 percent relative humidity as has been found for underivatized high-amylose corn starch film. The film was hot water soluble. It was also grease resistant as determined by covering the film with soybean oil and allowing to stand at room temperature for 1 month.

EXAMPLE 6

The jet-cooked product of Example 4 is about 22 percent concentration in hot water was spray dried to a powdery white product. Hot 10 percent dispersion of the product in water produced films having essentially the properties of the film of Example 4.

It can be readily seen from the results shown in Table 2 of Example 4 that the aqueous dispersions of this invention produce dry films of high clarity, tensile strength, and flexibility. It is also shown in Table 1 that films prepared from 10 percent aqueous dispersions of jet-cooked high-amylose corn starch acetates of D.S. 0.21 to 0.31 are essentially completely soluble in boiling water and remain so on cooling to 25° C. Films of the acetates of D.S. 0.25 and 0.31 are soluble in water at 25° C. without prior boiling of the mixture.

We claim:
1. Dry, transparent, edible films having hot and cold water solubility, said films comprising high-amylose corn starch acetate of 70 percent amylose content, said acetate having a D.S. of 0.21 to 0.31 and essentially all of its granules disintegrated.

References Cited

UNITED STATES PATENTS 2,362,282  11/1944  Lindsay _____ 260—233.5
2,461,139  2/1949   Caldwell _____ 260—233.5

OTHER REFERENCES

Whistler, ed., Methods in Carbohydrate Chemistry, vol. IV (Starch), 1964, pp. 286 to 288.

DONALD E. CZAJA, Primary Examiner

M. L. MARQUIS, Assistant Examiner

U.S. Cl. X.R.

99—171; 127—32, 33, 38, 70; 260—233.3